US006792610B2

(12) United States Patent
Cheon

(10) Patent No.: US 6,792,610 B2
(45) Date of Patent: Sep. 14, 2004

(54) ATTACHING A DEVICE DRIVER TO MULTIPLE LOGICAL DEVICES OF ONE PHYSICAL DEVICE

(75) Inventor: David Cheon, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 285 days.

(21) Appl. No.: 10/159,233

(22) Filed: May 30, 2002

(65) Prior Publication Data

US 2003/0225930 A1 Dec. 4, 2003

(51) Int. Cl.[7] ........................ G06F 13/10

(52) U.S. Cl. ........................ 719/327; 710/10; 710/48; 713/1

(58) Field of Search ........................ 709/223–228; 714/47, 39; 719/321–327; 710/1–19, 260–269; 713/1, 2, 100

(56) References Cited

U.S. PATENT DOCUMENTS 5,185,864 A * 2/1993 Bonevento et al. ........... 710/48
5,522,086 A * 5/1996 Burton et al. .................. 710/9
5,559,965 A * 9/1996 Oztaskin et al. ............ 710/104
6,418,485 B1 * 7/2002 Cooper et al. .............. 719/321
6,665,739 B2 * 12/2003 Vishlitzky et al. ............. 710/5
2002/0023179 A1 * 2/2002 Stanley .......................... 710/8

* cited by examiner

*Primary Examiner*—St. John Courtenay, III
(74) *Attorney, Agent, or Firm*—Park, Vaughan & Fleming LLP

(57) ABSTRACT

A system and method for facilitating attachment of a communication interface device driver to multiple logical devices defined on a single physical communication interface device. For each attachment procedure, an identifier of the affected physical device is read and a corresponding device soft state structure is located (or created, if one does not exist). For each attached logical device, a counter of the number of attachments for the physical device is incremented, and the device information pointer and instance identifier assigned to the logical device are noted. When the final logical device is attached, the physical device can be initialized. The device information pointer for a selected logical device (e.g., one having a particular binding name) is used as a parameter in one or more DDI functions.

26 Claims, 4 Drawing Sheets

START
Get MACID 202
Match any known device's MACID? 204
No → Allocate new device soft state structure 206
Yes
First or specified logical device? 208
Yes → Assign primary device info pointer and instance 210
No
Set driver private 212
Increment attachment counter; record device info pointer & instance, as necessary 214
Final attachment? 216
Yes → Initiate hardware initialization 218
No
END

ATTACHING A DEVICE DRIVER TO MULTIPLE LOGICAL DEVICES OF ONE PHYSICAL DEVICE

BACKGROUND

This invention relates to the field of computer systems. More particularly, a system and methods are provided for facilitating the attachment of a device driver to multiple logical communication devices.

Traditionally, a physical communication interface device, such as a Network Interface Circuit (NIC), hosts a single function for a computer system. Therefore, the operating system of the computer only needs to execute a module attachment (or detachment) procedure once for each physical device.

The use of multiple logical or physical communication devices, instead of a single device, can offer gains in communication efficiency. Although attempts have been made to operate multiple physical communication devices on a single computer board or card, it has been unknown to operate multiple logical devices on a single physical communication device in a manner requiring multiple device driver attaches (or detaches). This may be attributed to the inherent need to invoke multiple attach or detach procedures (i.e., once for each logical device), which adds complexity to the initialization of the physical device.

Also, the programming for a hardware device controlled via an FPGA (Field Programmable Gate Array), or other similar component, is often stored on a programmable read-only memory such as an EEPROM (Electrically Erasable Programmable Read Only Memory). The EEPROM contents must be re-flashed whenever the programming changes. The device's firmware may also need to be changed, along with the hardware revision, which may be an expensive process. And, updating the device's programming requires the read-only memory to be re-flashed with the new program logic—a procedure that typically cannot be performed by an average user. This makes it difficult to keep hardware devices' programming up-to-date.

SUMMARY

In one embodiment of the invention, a system and methods are provided for attaching a device driver to, or detaching a device driver from, multiple logical communication devices on a single physical device (e.g., a NIC).

To determine which physical device a logical device has been attached to, an identifier (e.g., a MAC identifier) may be read from the physical device. The identifier may be used to locate a device soft state structure for the physical device. If one does not exist, thereby indicating that the attached logical device was the first one attached, a device soft state structure is allocated and initialized.

For each attached logical device, a counter is incremented to note the number of logical devices attached to a given physical device. And, a device information pointer and instance identifier assigned to the logical device during attachment are recorded. The device information pointer may be recorded into the device soft state structure.

A selected device information pointer (e.g., for a logical device of a particular binding node name) may be used in one or more DDI (Device Dependent Interface) functions invoked after all logical devices have been attached.

During detachment of a logical device, a counter is kept of the number of logical devices detached from a given physical device. When all logical devices have been detached, allocated resources may be released, and the physical device may be reset.

In another embodiment of the invention, a system and methods are provided for delivering programming logic (e.g., an FPGA binary) to a computer system's hardware device via a device driver. The device driver may be loaded in a normal fashion, by the computer's operating system, to facilitate operation of the device.

In this embodiment, the hardware device programming instructions (e.g., an FPGA binary file) are converted into a source file for a selected programming language (e.g., C). The source file includes the contents of the binary file in a suitable data structure (e.g., an array of bytes). The source file is compiled to generate an object file, which is then linked with a device driver object file to form a device driver loadable module. When the device driver is loaded by the operating system and attached for the hardware device, the hardware device is initialized, at which time the encapsulated programming is loaded onto the device (e.g., an FPGA component of the device).

DETAILED DESCRIPTION

Figure 1:
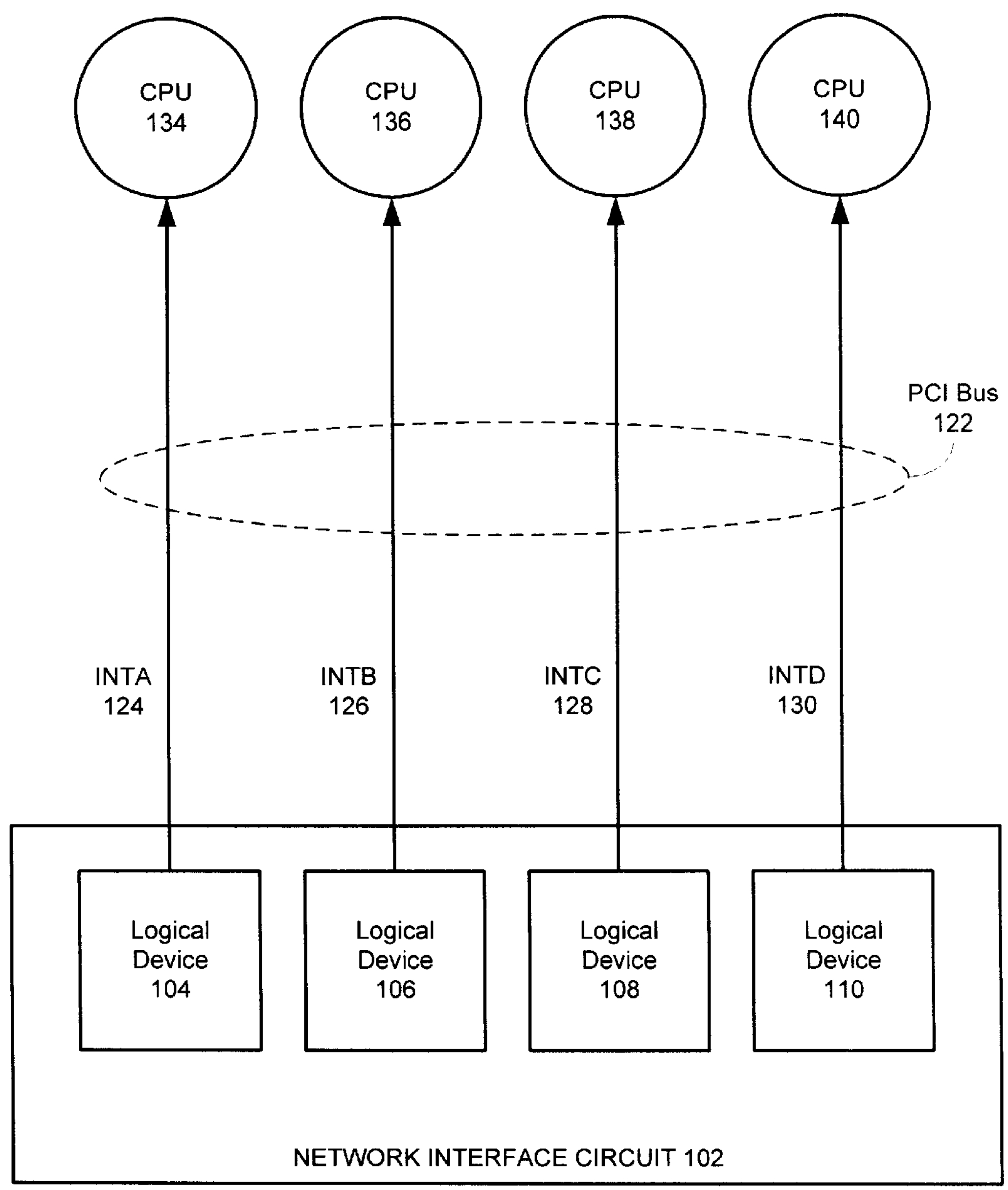
FIG. 1 is a block diagram of a network interface device hosting multiple logical devices, according to an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

Attaching a Device Driver to Multiple Logical Devices on One Physical Device

In one embodiment of the invention, a system and method are provided for attaching a communication device driver to (or detaching the device driver from) multiple logical devices defined on a single physical communication device. This embodiment may be implemented, for example, to facilitate operation of multiple PCI (Peripheral Component Interconnect) functions or sub-functions on a physical Network Interface Circuit (NIC) board or card (e.g., a PCI card).

In an embodiment of the invention, a network node is a multiprocessor computer operating the Solaris operating system. Further, the node may include multiple PCI NICs. For example, in an SRP (Spatial Reuse Protocol) network the node may employ two separate NICs to enable full use of the dual, counter-rotating ring network. In a PPP (Point-to-Point Protocol) network, a node may include one or more NICs.

In this illustrative embodiment, each NIC in the network node is a PCI device configured for up to four logical devices. The use of multiple logical devices can enable substantial communication efficiencies. In particular, the number of logical devices can exactly correspond to the number of interrupt lines in the NIC's PCI configuration space and the number of computer processors for managing communications handled by the logical devices. Thus, each logical device may be registered with a different interrupt line, and each interrupt line can be serviced by a different processor.

FIG. 1 illustrates a physical communication device hosting multiple logical devices, according to one embodiment of the invention. NIC 102 is a full-size PCI board capable of hosting up to four logical devices 104, 106, 108, 110. Among its components, PCI bus 122 provides interrupt lines 124, 126, 128, 130 for signalling interrupts between the logical devices and processors 134, 136, 138, 140.

In the embodiment of FIG. 1, the four logical devices may participate in a single IP (Internet Protocol) communication stream and share a single IP address (where the network layer protocol is IP). Each logical device may, however, host a different Transport Control Protocol (TCP)/IP connection and/or application (e.g., http, NFS (Network File System), FTP (File Transport Protocol), OLTP (Online Transaction Protocol)), and may therefore be associated with a different TCP port.

Because there are four separate logical devices in the embodiment of FIG. 1, the operating system of the host node will invoke an "attach" procedure four times, to attach a device driver to each device. For example, in the Solaris operating system, the Solaris kernel will recognize four devices in the PCI configuration space of NIC 102, and invoke the driver attachment function (a function identified by *devo_attach) of the device operations structure (dev_ops) for each logical device. Similarly, when detaching the device driver from the logical devices, the Solaris kernel will call the detachment function (identified by *devo_detach) four times.

Because the attach (or detach) function is performed multiple times for a single physical device in an embodiment of the invention, the system will track the progress of the attachment (or detachment) operations. In particular, because the hardware (e.g., NIC) that hosts multiple logical devices may only be initialized after the device driver attachments have completed, there needs to be some way of determining when each logical device has been attached. An operating system may not perform the attachments in a predictable sequence (e.g., particularly when the node includes multiple physical devices), thereby making the procedure more complex.

Figure 2:
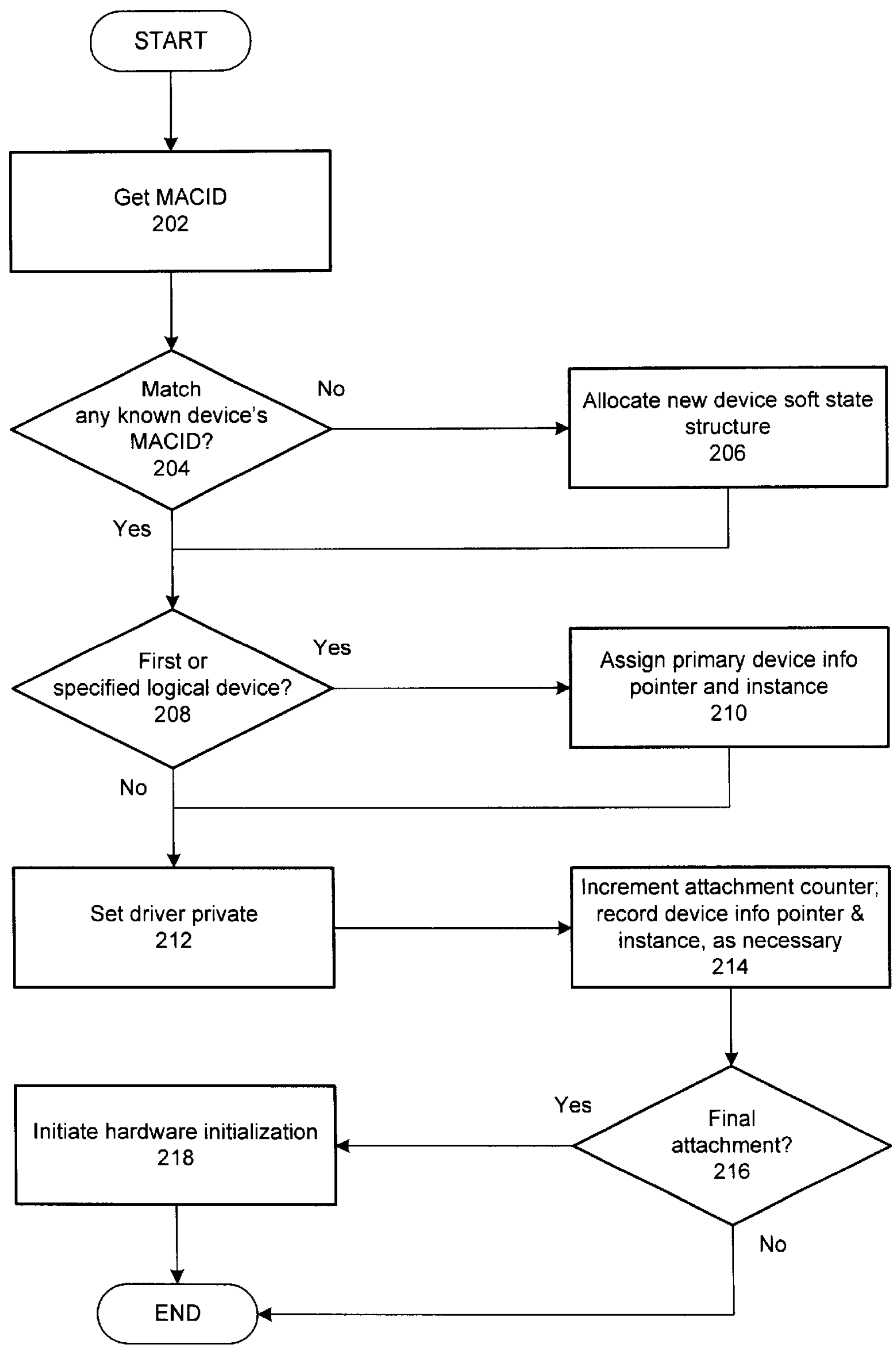
FIG. 2 is a flowchart illustrating one method of facilitating the attachment of multiple logical devices for a single physical communication interface device, according to an embodiment of the invention.

FIG. 2 demonstrates a procedure for performing device driver attachments for multiple logical devices of a single physical device, according to one embodiment of the invention. In this embodiment, the operating system used by the computer system is Solaris, and one single device driver (corresponding to the physical device) is attached to each logical device of the physical device. In an alternative embodiment, multiple device drivers may be used.

In state 202, the operating system recognizes a logic device and initiates its "attach" procedure for that device. Therefore, the MAC-ID (Medium Access Control identifier), or MAC address, of the physical device on which the logical device is located is obtained (e.g., by reading it from a device PROM).

In state 204, the current MAC-ID (of the physical device) is compared to the MAC-IDs of any known physical devices. In particular, in one embodiment of the invention, the device driver constructs a separate device soft state structure for each physical device, and the structures (if there are more than one) are linked together (e.g., via pointers or other references). Each device soft state structure contains various information or statuses of the corresponding physical device, including the MAC-ID. Thus, the linked structures can be traversed and searched for a MAC-ID matching the current MAC-ID. If a match is found, the illustrated method advances to state 208.

Otherwise, in state 206, this is the first attachment for the current physical device. Therefore, a new device soft state structure is allocated and initialized for the device, and its MAC-ID is set to the current MAC-ID. Also, the device driver may initialize a few bookkeeping values described shortly (e.g., to count the number of attachments, record the logical devices' device information pointers and record instance identifiers assigned to the logical devices).

In state 208, a determination is made as to whether the current attachment is attaching a logical device having a specified node name or binding name. For example, if the node names of the four logical devices in FIG. 1 were a11, a12, a13 and a14, state 208 may involve the determination of whether node a11 is being attached. If not, the procedure continues at state 212.

Otherwise, in state 210, the device information pointer (dip) assigned to a logical device having a specified node name is assigned as the primary_dip for the physical device. A dip is assigned to each logical device, by the operating system, during the attach function. Illustratively, the primary dip is saved for use as a parameter for identifying the physical device when invoking a DDI function (e.g., during initialization of the physical device after all of the logical device attachments).

In an embodiment of the invention, the DDI functions that are invoked once for each physical device, after the device driver has been attached to all logical devices, may include any or all of the following: pci_config_setup, ddi_regs_map_setup, ddi_get_iblock_cookie, ddi_ptob, ddi_ dma_alloc_handle, ddi_prop_create and ddi_prop_remove_all. Other functions may be invoked for each logical device and may therefore require the individual device soft state pointers assigned to each logical device. These functions include any or all of the following: ips_add_softintr, ddi_create_minor_node, ddi_remove_minor_node, ddi_report_dev, ddi_remove_intr and ddi_set_driver_private. Some of functions identified herein may be used in conjunction with device driver detach operations rather than attach operations.

Also, the instance identifier assigned to the specified logical device may be recorded for use (e.g., as primary_instance) when plumbing the protocol stack for the device driver. Illustratively, an instance identifier is assigned by the operating system to each logical device during execution of the attach function. In an alternative embodiment, any of the device information pointers or instance identifiers may be used as the "primary" (i.e., not necessarily the identifier of the specified or first device).

In state 212, the DDI interface (e.g., ddi_set_driver_private) is invoked to associate the dip assigned to the current logical device with the device soft state structure of the physical device. Thus, the device information pointers for all the logical devices of one physical device will be associated with the physical device's device soft state structure. In particular, the address of the physical device's device information pointer may be recorded in each logical device's device information pointer.

In state 214, an attachment counter is incremented for the current physical device, in order to determine when the device driver has been attached to the last (e.g., fourth) logical device. In addition, the instance identifier and device information pointer may be recorded (e.g., in arrays).

In state 216, the device driver determines whether this attachment function was for the final (e.g., fourth) logical device. This determination may be aided by reference to an attachment counter described above. If this was not the final attachment, the illustrated method ends or repeats with the attachment of the next logical device.

Otherwise, in state 218, after the final attachment, initialization of the hardware (the physical device) can be initiated, along with allocation of resources and registration of interrupts, to complete the attach sequence.

After state 218, the procedure ends.

Illustratively, the method of FIG. 2 may be applied by a device driver associated with the physical device. The actual attachment of a logical device may be performed by the kernel (e.g., by invoking the device driver's attach function).

Figure 3:
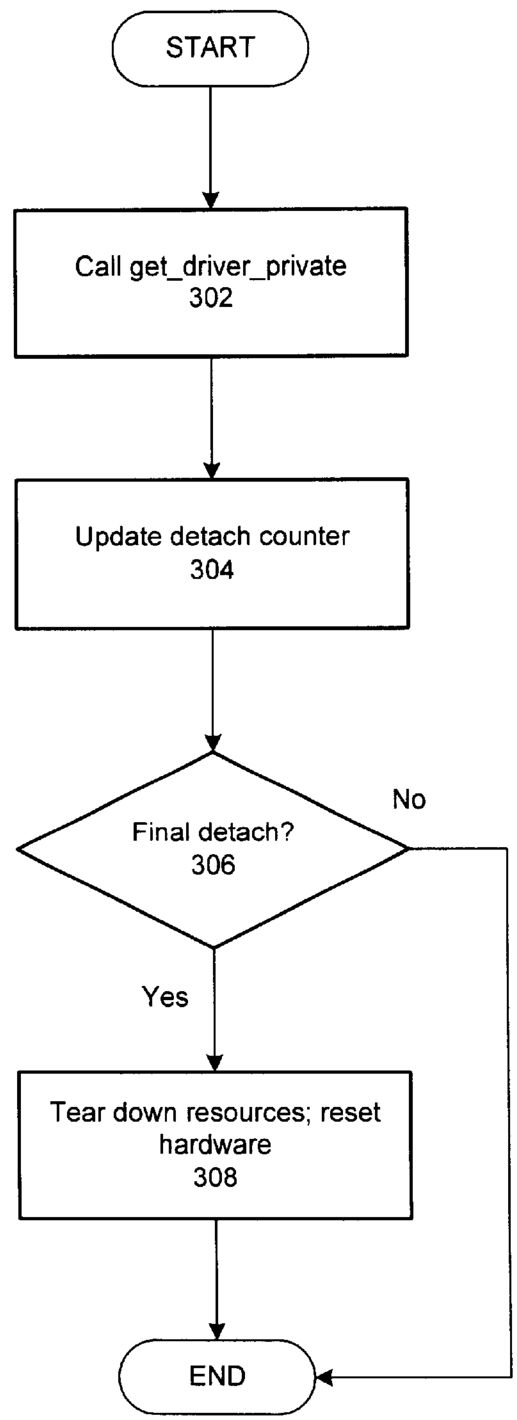
FIG. 3 is a flowchart illustrating one method of facilitating the detachment of multiple logical devices for a single physical communication interface device, according to an embodiment of the present invention.

FIG. 3 demonstrates a procedure for detaching logical devices of a physical communication device, according to one embodiment of the invention.

In state 302, the operating system invokes the detach function for an attached logical device. Using the device information pointer (dip) of that logical device, the device soft state structure of the physical device is located by invoking get_driver_private, using the dip as a parameter. Illustratively, the kernel tracks the dip associated with each logical device and provides it to the device driver when invoking the detach function.

In state 304, a detach counter associated with the physical device is updated to indicate that another logical device has been detached.

Based on the detach counter (or some other indicator), in state 306 a determination is made as to whether all (e.g., four) logical devices have been detached. If not, the illustrated procedure ends, to await detachment of another logical device.

Otherwise, in state 308, all logical devices have been detached. Therefore, the device driver tears down resources allocated to the physical/logical devices (e.g., the device soft state structure, device information pointers) and resets the physical device.

Illustratively, the method of FIG. 3 may be performed by the device driver associated with the physical device, in response to a detachment request from the kernel.

Delivering Hardware Programming Via a Device Driver

In one embodiment of the invention, logic for operating an FPGA (Field Programmable Gate Array), or a similar component configured to control a hardware device (e.g., a network interface circuit), is delivered to the FPGA via a device driver.

In this embodiment, the FPGA logic is merged with device driver logic in a device driver file. When the operating system (of the computer system in which the hardware device is installed) loads the device driver and attaches it to the device, as part of the hardware initialization process the device driver downloads the FPGA logic to the FPGA. The FPGA logic may be configured as a data array within the device driver file.

Figure 4:
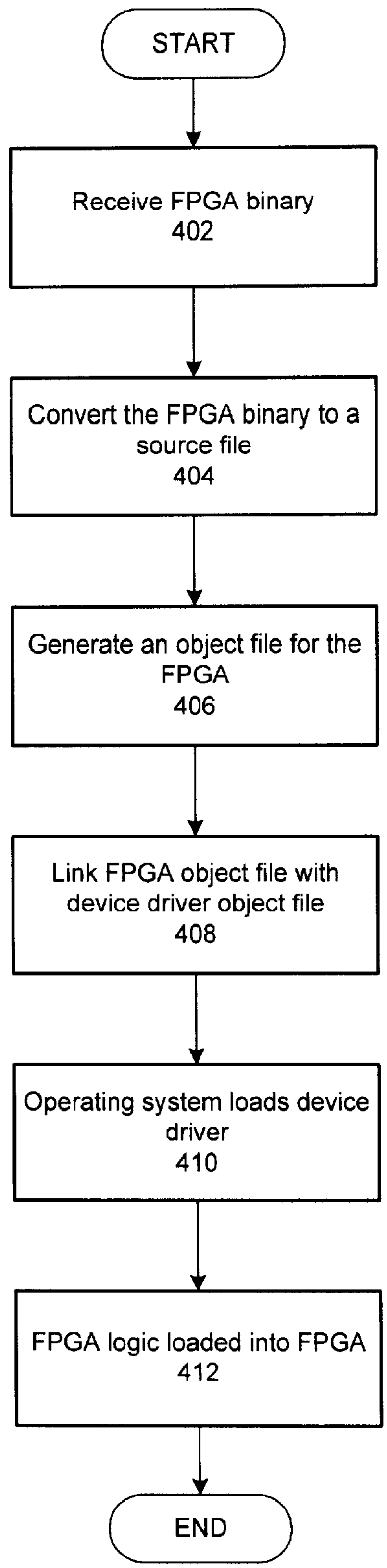
FIG. 4 is a flowchart demonstrating one method of delivering a hardware device's programming via a device driver, according to an embodiment of the invention.

FIG. 4 demonstrates a method of using a device driver file to deliver a hardware device's operating logic, according to one embodiment of the invention. In this invention, the hardware device is a network interface device (e.g., a NIC), and the logic is executed by an FPGA. Other embodiments of the invention may be derived from the following description.

In state 402, the source or raw FPGA binary for controlling the physical operation of the network interface device is received or accessed. For example, an FPGA binary file may be provided by a vendor of the hardware device that includes the FPGA.

In state 404, the FPGA binary is converted into a text file or other file suitable for compilation. For example, the FPGA binary content may be structured as an array of bytes, or other suitable data structure, within a ".c" file, for compilation by a C compiler.

In state 406, the source file is compiled to produce an object file containing the FPGA binary data.

In state 408, the FPGA object file is linked with a device driver object file. The two object files are combined to form a loadable module recognizable to a computer operating system.

In state 410, the operating system loads the device driver module as part of its initialization of the network interface device. A part of the initialization, the device driver may be attached to the network interface device, or one or more logical devices defined on the network interface device.

In state 412, the hardware initialization of the network device is initiated (e.g., by the device driver) and the device driver loads the FPGA data into the FPGA. Illustratively, the device driver may post the FPGA data, including the new FPGA binary, into static RAM and invoke the embedded firmware to load the FPGA binary and program it into the FPGA. When the hardware completes initialization, the network interface device then operates according to the code downloaded into the FPGA.

The foregoing descriptions of embodiments of the invention have been presented for purposes of illustration and description only. They are not intended to be exhaustive or to limit the invention to the forms disclosed; the scope of the invention is defined by the appended claims.

What is claimed is:

1. A method of monitoring the attachment of multiple logical devices for a single physical communication interface, the method comprising:

for each attachment of one of the multiple logical devices:
incrementing a counter of the number of logical devices attached;
noting a device information pointer assigned to said attached logical device; and
recording an instance identifier assigned to said attached logical device; and
after attachment of all of the multiple logical devices for the physical communication interface, initializing the physical communication interface.

2. The method of claim 1, wherein:
said attachment is initiated by an operating system;
said device information pointer is assigned by the operating system in association with the attachment; and
said instance identifier is assigned by the operating system in association with the attachment.

3. The method of claim 1, further comprising obtaining an identifier of the physical communication interface.

4. The method of claim 3, wherein said identifier comprises a MAC (Medium Access Control) identifier.

5. The method of claim 3, further comprising:
determining whether a device soft state structure has been allocated for the physical communication interface; and
if no device soft state structure has been allocated for the physical communication interface, allocating a new device soft state structure to the physical communication interface.

6. The method of claim 5, wherein said allocating comprises configuring said new device soft state structure with the identifier of the physical communication interface.

7. The method of claim 5, further comprising, for each logical device:
associating said device soft state structure of the physical communication interface with said device information pointer assigned to the logical device.

8. The method of claim 1, further comprising, for each attachment of one of the multiple logical devices:
if a node name of said attached logical device matches a predetermined node name, designating said device information pointer as the primary device information pointer.

9. The method of claim 8, further comprising:
using said primary device information pointer as a parameter in a DDI (Device Driver Interface) function invoked after said attachment of all of the multiple logical devices.

10. A computer readable storage medium storing instructions that, when executed by a computer, cause the computer to perform a method of monitoring the attachment of multiple logical devices for a single physical communication interface, the method comprising:
for each attachment of one of the multiple logical devices:
incrementing a counter of the number of logical devices attached;
noting a device information pointer assigned to said attached logical device; and
recording an instance identifier assigned to said attached logical device; and
after attachment of all of the multiple logical devices for the physical communication interface, initializing the physical communication interface.

11. A method of attaching a communication interface device driver to multiple logical devices of a single physical communication interface, the method comprising:
receiving an identifier of the physical communication interface;
initializing a device soft state structure for the physical communication interface if a device soft state structure does not already exist for the physical communication interface;
receiving a first device information pointer assigned to a first logical device attached for the physical communication interface;
receiving a first instance identifier of the first attached logical device;
associating the first device information pointer with the device soft state structure;
incrementing a count of the number of logical devices that have been attached for the physical communication interface; and
initializing the physical communication interface after all of the multiple logical devices have been attached.

12. The method of claim 11, wherein said receiving an identifier of the physical communication interface comprises:
reading a MAC identifier from the physical communication interface.

13. The method of claim 11, wherein said initializing a device soft state structure comprises:
searching a list of device soft state structures for a device soft state structure comprising the identifier of the physical communication interface.

14. The method of claim 11, wherein the physical communication interface is a network interface circuit.

15. A computer readable storage medium storing instructions that, when executed by a computer, cause the computer to perform a method of attaching a communication interface device driver to multiple logical devices of a single physical communication interface, the method comprising:
receiving an identifier of the physical communication interface;
initializing a device soft state structure for the physical communication interface if a device soft state structure does not already exist for the physical communication interface;
receiving a first device information pointer assigned to a first logical device attached for the physical communication interface;
receiving a first instance identifier of the first attached logical device;
associating the first device information pointer with the device soft state structure;
incrementing a count of the number of logical devices that have been attached for the physical communication interface; and
initializing the physical communication interface after all of the multiple logical devices have been attached.

16. A method of facilitating detachment of multiple logical devices associated with a single physical communication interface device, the method comprising:
for a detached logical device, accessing a device soft state structure associated with a physical communication interface on which said detached logical device was defined;
updating a count of the number of logical devices detached for the physical communication interface; and
if said detached logical device was the last of a predetermined number of logical devices detached for the physical communication interface, resetting the physical communication interface.

17. The method of claim 16, wherein said accessing comprises:

locating a device soft state structure associated with a device information pointer assigned to said detached logical device.

18. The method of claim 17, wherein said device information pointer was associated with the device soft state structure in conjunction with a previous attachment of said logical device with the physical communication interface.

19. A computer readable storage medium storing instructions that, when executed by a computer, cause the computer to perform a method of facilitating detachment of multiple logical devices associated with a single physical communication interface device, the method comprising:

for a detached logical device, accessing a device soft state structure associated with a physical communication interface on which said detached logical device was defined;

updating a count of the number of logical devices detached for the physical communication interface; and if said detached logical device was the last of a predetermined number of logical devices detached for the physical communication interface, resetting the physical communication interface.

20. A computer system configured to communicate with one or more other computer systems via a network, the computer system comprising:

one or more processors;

a first network interface device configured to provide access to the network;

a first plurality of interrupt lines coupling said first network interface device to said one or more processors; and a first plurality of logical devices defined on said first network interface device, wherein each of said first plurality of logical devices is coupled to a separate one of said first plurality of interrupt lines.

21. The computer system of claim 20, further comprising:

a second network interface device;

a second plurality of interrupt lines coupling said second network interface device to said one or more processors; and a second plurality of logical devices defined on said second network interface device, wherein each of said second plurality of logical devices is coupled to a separate one of said second plurality of interrupt lines.

22. The computer system of claim 20, further comprising a device driver for operating said first network interface device, wherein said device driver is attached to each of said first plurality of logical devices.

23. The computer system of claim 22, further comprising a counter configured to track the number of said logical devices to which said device driver is attached.

24. The computer system of claim 20, further comprising, for each said logical device, a device information pointer.

25. The computer system of claim 24, wherein said device information pointer is configured with a device soft state structure associated with said first network interface device.

26. The computer system of claim 20, further comprising, for each said logical device, an instance identifier configured to identify said logical device.

* * * * *